(12) United States Patent
Vinitzky

(10) Patent No.: US 6,625,630 B1
(45) Date of Patent: Sep. 23, 2003

(54) TWO CYCLE FFT

(75) Inventor: Gil Vinitzky, Azur (IL)

(73) Assignee: DSP Group Ltd., Herzelia (IL)

( * ) Notice: Subject to any disclaimer, the term of this patent is extended or adjusted under 35 U.S.C. 154(b) by 472 days.

(21) Appl. No.: 09/587,617

(22) Filed: Jun. 5, 2000

(51) Int. Cl.[7] .............................................. G06F 17/14
(52) U.S. Cl. ..................................................... 708/404
(58) Field of Search ............................. 708/400–409, 708/300, 319, 523, 603

(56) References Cited

U.S. PATENT DOCUMENTS

| 3,673,399 | A | * | 6/1972 | Hancke et al. | 708/404 |
| 4,612,626 | A | * | 9/1986 | Marchant | 708/404 |
| 5,038,311 | A | * | 8/1991 | Monastra et al. | 708/406 |
| 5,373,460 | A | * | 12/1994 | Marks, II | 708/300 |
| 5,548,543 | A | * | 8/1996 | Wang | 708/319 |
| 5,941,940 | A | * | 8/1999 | Prasad et al. | 708/523 |
| 6,317,770 | B1 | * | 11/2001 | Lim et al. | 708/524 |
| 6,385,635 | B1 | * | 5/2002 | Ishii | 708/603 |
| 6,463,451 | B2 | * | 10/2002 | Lim et al. | 708/523 |

* cited by examiner

Primary Examiner—Chuong Dinh Ngo
Assistant Examiner—Chat Do
(74) Attorney, Agent, or Firm—Eitan, Pearl, Latzer & Cohen Zedek, LLP

(57) ABSTRACT

A digital signal processor (DSP) includes at least two multipliers, at least two three-input arithmetic logic units (ALU), at least two first-cycle registers, at least two second-cycle registers, and multiplexing apparatus. The digital signal processor is able to perform a Fast Fourier Transform (FFT) calculation in two consecutive processing cycles.

6 Claims, 2 Drawing Sheets

| | Zr0 | Zi0 | Zr1 | Zi1 | P0 | P1 | A0 | A0hp | A1 | A2 | A2hp | A3 |
|---|---|---|---|---|---|---|---|---|---|---|---|---|
| INITIAL STATE | Ar[1] | Ai[1] | | | | Bi[1]*Wi[1] | | | | | | |
| CYCLE #1 | Ar[2] | Ai[2] | Ar[1] | Ai[1] | Br[1]*Wr[1] | Bi[1]*Wi[1] | Ar[1] +Br[1]*Wr[1] -Bi[1]*Wi[1] | | | | | |
| CYCLE #2 | Ar[2] | Ai[2] | Ar[1] | Ai[1] | Br[1]*Wr[1] | Bi[2]*Wi[2] | Ar[1] +Br[1]*Wr[1] -Bi[1]*Wi[1] | | Ai[1] +Br[1]*Wi[1] +Bi[1]*Wr[1] | Ar[1] -Br[1]*Wr[1] +Bi[1]*Wi[1] | | Ai[1] -Br[1]*Wi[1] -Bi[1]*Wr[1] |
| CYCLE #3 | Ar[3] | Ai[3] | Ar[2] | Ai[2] | Br[2]*Wr[2] | Bi[2]*Wi[2] | Ar[2] +Br[2]*Wr[2] -Bi[2]*Wi[2] | Ar[1] +Br[1]*Wr[1] -Bi[1]*Wi[1] | Ai[1] +Br[1]*Wi[1] +Bi[1]*Wr[1] | Ar[1] -Br[1]*Wr[1] +Bi[1]*Wi[1] | Ar[1] -Br[1]*Wr[1] +Bi[1]*Wi[1] | Ai[1] -Br[1]*Wi[1] -Bi[1]*Wr[1] |
| CYCLE #4 | Ar[3] | Ai[3] | Ar[2] | Ai[2] | Br[2]*Wr[2] | Bi[3]*Wi[3] | Ar[2] +Br[2]*Wr[2] -Bi[2]*Wi[2] | Ar[2] +Br[2]*Wr[2] -Bi[2]*Wi[2] | Ai[2] +Br[2]*Wi[2] +Bi[2]*Wr[2] | Ar[2] -Br[2]*Wr[2] +Bi[2]*Wi[2] | Ar[1] -Br[1]*Wr[1] +Bi[1]*Wi[1] | Ai[2] -Br[2]*Wi[2] -Bi[2]*Wr[2] |
| CYCLE #5 | Ar[4] | Ai[4] | Ar[3] | Ai[3] | Br[3]*Wr[3] | Bi[3]*Wi[3] | Ar[3] +Br[3]*Wr[3] -Bi[3]*Wi[3] | Ar[2] +Br[2]*Wr[2] -Bi[2]*Wi[2] | Ai[2] +Br[2]*Wi[2] +Bi[2]*Wr[2] | Ar[3] -Br[3]*Wr[3] +Bi[3]*Wi[3] | Ar[2] -Br[2]*Wr[2] +Bi[2]*Wi[2] | Ai[2] -Br[2]*Wi[2] -Bi[2]*Wr[2] |
| CYCLE #6 | Ar[4] | Ai[4] | Ar[3] | Ai[3] | Br[3]*Wr[3] | Bi[4]*Wi[4] | Ar[3] +Br[3]*Wr[3] -Bi[3]*Wi[3] | Ar[3] +Br[3]*Wr[3] -Bi[3]*Wi[3] | Ai[3] +Br[3]*Wi[3] +Bi[3]*Wr[3] | Ar[3] -Br[3]*Wr[3] +Bi[3]*Wi[3] | Ar[3] -Br[3]*Wr[3] +Bi[3]*Wi[3] | Ai[3] -Br[3]*Wi[3] -Bi[3]*Wr[3] |
| CYCLE #7 | Ar[5] | Ai[5] | Ar[4] | Ai[4] | Br[4]*Wr[4] | Bi[4]*Wi[4] | Ar[4] +Br[4]*Wr[4] -Bi[4]*Wi[4] | Ar[3] +Br[3]*Wr[3] -Bi[3]*Wi[3] | Ai[3] +Br[3]*Wi[3] +Bi[3]*Wr[3] | Ar[4] -Br[4]*Wr[4] +Bi[4]*Wi[4] | Ar[3] -Br[3]*Wr[3] +Bi[3]*Wi[3] | Ai[3] -Br[3]*Wi[3] -Bi[3]*Wr[3] |
| CYCLE #8 | Ar[5] | Ai[5] | Ar[4] | Ai[4] | Br[5]*Wr[5] | Bi[5]*Wi[5] | Ar[4] +Br[4]*Wr[4] -Bi[4]*Wi[4] | | Ai[4] +Br[4]*Wi[4] +Bi[4]*Wr[4] | Ar[4] -Br[4]*Wr[4] +Bi[4]*Wi[4] | | Ai[4] -Br[4]*Wi[4] -Bi[4]*Wr[4] |

FIG. 2

TWO CYCLE FFT

FIELD OF THE INVENTION

The present invention relates to Digital Signal Processing (DSP) in general, and more particularly to a DSP architecture for performing Fast Fourier Transform (FFT) butterfly operations in two cycles.

BACKGROUND OF THE INVENTION

A digital signal processor (DSP) is a special-purpose computer that is designed to optimize digital signal processing tasks such as Fast Fourier Transform (FFT) calculations, digital filters, image processing, and speech recognition. DSP applications are typically characterized by real-time operation, high interrupt rates, and intensive numeric computations. In addition, DSP applications tend to be intensive in memory access operations and require the input and output of large quantities of data.

Two advancements in DSP architecture, namely "in-place" memory management and the dual multiplier accumulator (dual-MAC), have led to increases in digital signal processing, efficiency, and speed. In order to reduce the amount of memory required for FFT calculations, an "in-place" memory management scheme may be employed whereby the FFT input data array is overwritten with the results of FFT calculations, thus eliminating the need for an additional memory array for storing the results at each stage of the FFT. The introduction of the dual-MAC, which is able to perform simultaneous multiplication and addition operations simultaneously, has also greatly enhanced DSP performance in many applications.

In order to implement "in-place" memory management in a dual-MAC DSP architecture, designers have typically either increased the number of cycles required to complete a series of operations or have introduced complex hardware solutions such as dual-port random access memory (RAM). Unfortunately, increasing the number of cycles reduces DSP performance, while the introduction of dual-port RAM greatly increases the DSP memory size, negating the memory efficiencies of "in-place" FFT. For these reasons dual-MAC DSP architectures generally perform FFT calculations without "in-place" memory management.

Other difficulties surrounding FFT implementation in a dual-MAC DSP architecture relate to DSP internal resources. While performing an FFT butterfly operation, intermediate results are generally stored in internal registers. Unfortunately, in order to allow subsequent operations to be performed, some intermediate results must be written to memory. Should the memory be in a read cycle, the intermediate results must wait until the next cycle to be written to memory, thus degrading performance unless special hardware such as dual-port RAM is used.

SUMMARY OF THE INVENTION

The present invention seeks to provide a DSP architecture that overcomes disadvantages of the prior art. A dual-MAC DSP architecture is provided that is capable of performing Fast Fourier Transform (FFT) butterfly operations in two cycles and without the need for specialized memory.

There is thus provided in accordance with a preferred embodiment of the present invention a digital signal processing (DSP) architecture including at least two multipliers where each multiplier is operative to receive either of a real and an imaginary first data value and either of a real and an imaginary coefficient value and multiply the data and coefficient values to provide a multiplication result, at least two three-input arithmetic logic units (ALU) where each ALU is operative to receive each of the multiplication results from the multipliers and either of a real and an imaginary second data value and perform any of addition and subtraction upon each of the multiplication results and the second data value to provide a Fast Fourier Transform (FFT) calculation result, at least two first-cycle registers where each first-cycle registers operative to receive the FFT calculation result from one of the ALUs calculated during a first processing cycle of two consecutive processing cycles, at least two second-cycle registers where each second-cycle register is operative to receive the FFT calculation result from one of the ALUs calculated during a second processing cycle of the two consecutive processing cycles, and multiplexing apparatus operative to selectably retrieve and forward for storage in memory the FFT calculation results from one of the first-cycle registers and one of the second-cycle registers during a first memory-write cycle of two consecutive memory write cycles and Be FFT calculation results from the other of the first-cycle registers and the other of the second-cycle registers during a second memory-write cycle of the two consecutive memory write cycles.

Further in accordance with a preferred embodiment of the present invention the apparatus further includes at least a first cosinusoidal register for receiving real cosinusoidal data input, at least a second cosinusoidal register for receiving imaginary cosinusoidal data input, and a multiplexer for selectably providing data from either of the cosinusoidal registers to either of the ALUs.

Still further in accordance with a preferred embodiment of the present invention the apparatus further includes rounding apparatus operative to concatenate a rounding constant to the multiplexed cosinusoidal data, thereby forming a low-ordered portion of concatenated input either of the ALUs.

There is also provided in accordance with a preferred embodiment of the present invention a digital signal processing (DSP) method including the steps of receiving at at least two multipliers either of a real and an imaginary first data value and either of a real and an imaginary coefficient value, multiplying at the two multipliers the data and coefficient values to provide a multiplication result, receiving at at least two three-input arithmetic logic units (ALU) each of the multiplication results from the multipliers and either of a real and an imaginary second data value, performing at the ALUs any of addition and subtraction operations upon each of the multiplication results and the second data value to provide a Fast Fourier Transform calculation result, receiving at at least two first-cycle registers the FFT calculation result from one of the ALUs calculated during a first processing cycle of two consecutive processing cycles, receiving at at least two second-cycle registers the FFT calculation result from one of the ALUs calculated during a second processing cycle of the two consecutive processing cycles, and selectably retrieving and forwarding for storage in memory the FFT calculation results from one of the first-cycle registers and one of the second-cycle registers during a first memory-write cycle of two consecutive memory write cycles and the FFT calculation results from the other of the first-cycle registers and the other of the second-cycle registers during a second memory-write cycle of the two consecutive memory write cycles.

Further in accordance with a preferred embodiment of the present invention the method further includes receiving real cosinusoidal data input at at least a first cosinusoidal register, receiving imaginary cosinusoidal data input at at least a second cosinusoidal register, and selectably providing data from either of the cosinusoidal registers to either of the ALUs.

Still further in accordance with a preferred embodiment of the present invention the method further includes concatenating a rounding constant to the multiplexed cosinusoidal data, thereby forming a low-ordered portion of concatenated input either of the ALUs.

BRIEF DESCRIPTION OF THE DRAWINGS

The present invention will be understood and appreciated more fully from the following detailed description taken in conjunction with the appended drawings in which:

FIG. 2 is a simplified tabular illustration of the contents of the registers of FIG. 1 in accordance with a preferred method of operation of the DSP architecture of FIG. 1 over several cycles.

DETAILED DESCRIPTION OF THE INVENTION

Figure 1:
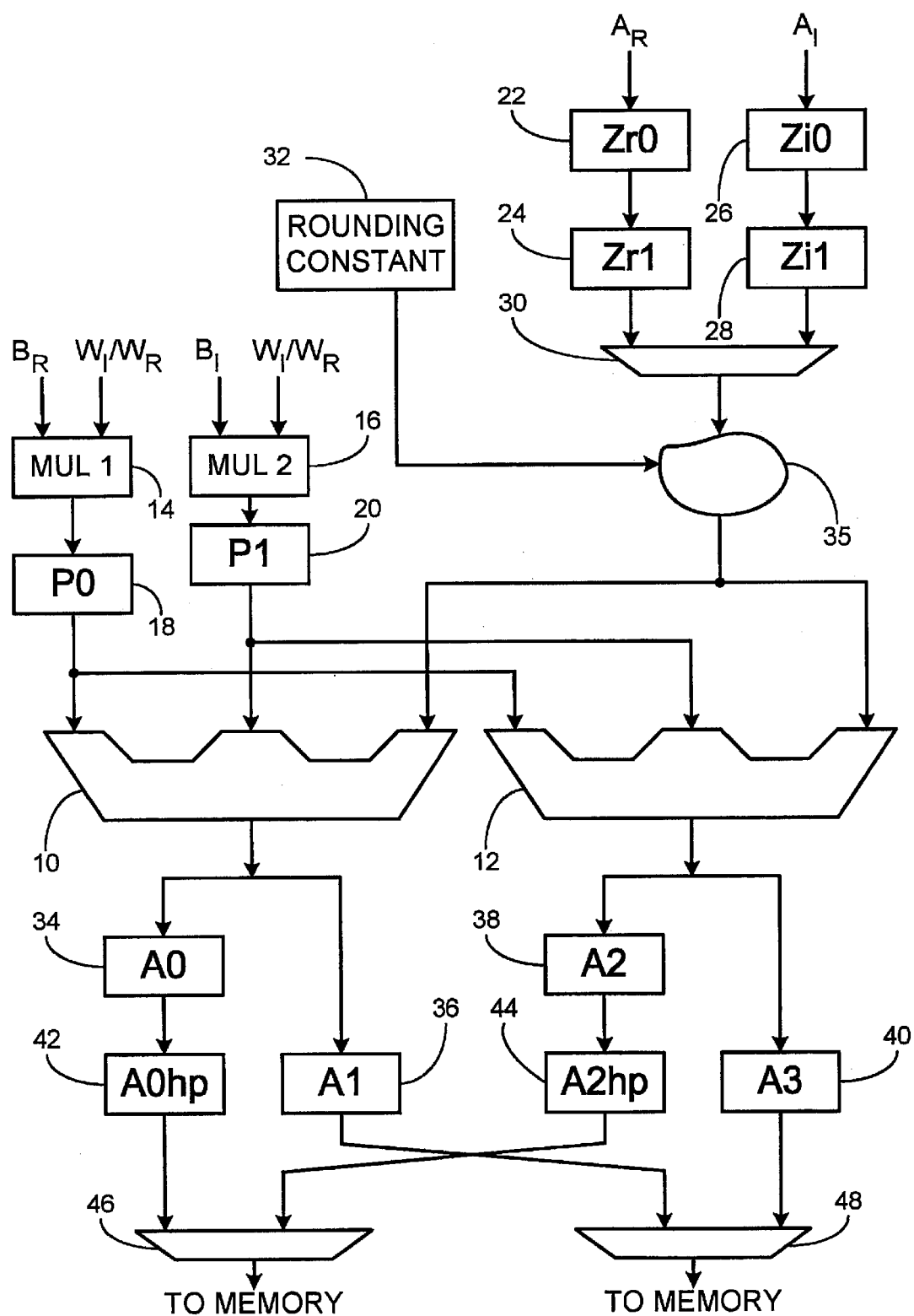
FIG. 1 is a simplified block diagram illustration of a DSP architecture adapted for performing FFT calculations, constructed and operative in accordance with a preferred embodiment of the present invention.

Reference is now made to FIG. 1 which is a simplified block diagram illustration of a DSP architecture adapted for performing FFT calculations, constructed and operative in accordance with a preferred embodiment of the present invention. The DSP architecture shown in FIG. 1 includes two three-input arithmetic logic units (ALU) 10 and 12, each capable of receiving three inputs and performing any combination of addition and subtraction on the three inputs in response to program instructions to yield a combined result. Two multipliers 14 and 16, labeled Mul 1 and Mul 2, are typically provided for performing multiplication on real and imaginary sinusoidal data inputs $B_R$ and $B_I$ and coefficients $W_R$ and $W_I$ using conventional techniques. Results from multipliers 14 and 16 are preferably stored in registers 18 and 20 respectively, labeled P0 and P1, from which the results are then input to ALUs 10 and 12. Two registers 22 and 24, labeled Zr0 and Zr1, are preferably provided for receiving real cosinusoidal data input $A_R$, as are two registers 26 and 28, labeled Zi0 and Zi1, for receiving imaginary cosinusoidal data input $A_I$. A multiplexer 30 is typically provided for selectably providing data from either of registers Zr1 and Zi1 to ALUs 10 and 12, preferably together with a rounding constant 32 being concatenated to the multiplexed data, shown at reference numeral 35, to form a low-ordered portion of the concatenated input to ALUs. 10 and 12. Two registers 34 and 36, labeled A0 and A1, are preferably provided for receiving output from ALU 10, as are two registers 38 and 40, labeled A2 and A3, for receiving output from ALU 12. An additional register 42, labeled A0hp, is preferably provided for receiving a high-ordered portion of the data stored in A0, as is an additional register 44, labeled A2hp, for receiving a high-ordered portion of the data stored in A2. Multiplexing apparatus, is preferably provided including a multiplexer 46 for selectably retrieving data from either A0hp or A2hp and provide the data for storage in memory, and a multiplexer 48 for selectably retrieving data from either A1 or A3.

Typical operation of the DSP architecture shown in FIG. 1 is now described with additional reference to FIG. 2, which is a simplified tabular illustration of the contents of the registers of FIG. 1 in accordance with a preferred method of operation of the DSP architecture of FIG. 1 over several cycles. In the method of FIG. 2 an initial state is defined for illustration purposes where registers Zr0 and Zi0 receive input values for $A_R$ and $A_I$, herein referred to by index as $A_R[1]$ and $A_I[1]$. Mul 1 receives input values for $B_R$ and $W_R$, herein referred to by index as $B_R[1]$ and $W_R[1]$, and Mul 2 receives input values for B, and WI, herein referred to by index as $B_I[1]$ and $W_I[1]$. Mul 1 then stores the multiplication result $B_R[1]*W_R[1]$ to register P0, and Mul 2 stores $B_I[1]*W_I[1]$ to register P1.

Processing for Cycle #1 proceeds with the contents of registers Zr0 and Zi0 being input to registers Zr1 and Zi1 respectively, with Zr0 and Zi0 receiving new input values for $A_R$ and $A_I$, herein referred to by index as $A_R[2]$ and $A_I[2]$. Multiplexer 30 retrieves the contents of either register Zr1 or Zi1, the rounding constant is concatenated to the value retrieved, and the concatenated result is provided to ALUs 10 and 12. The contents of registers P0 and P1 are likewise provided to ALUs 10 and 12 which then perform the necessary addition and/or subtraction operations as required for FFT calculations and store the results to registers A0 and respectively. P0 and P1 receive new multiplication results $B_R[1]*W_R[1]$ and $B_I[1]*W_R[1]$ respectively from Mul 1 and Mul 2.

Processing for Cycle #2 proceeds where multiplexer 30 retrieves the contents of either register Zr1 or Zi1 that was not retrieved in Cycle #1, the rounding constant is concatenated to the value retrieved, and the concatenated result is provided to ALUs 10 and 12. The contents of registers P0 and P1 are provided to ALUs 10 and 12 Which then perform the necessary addition and/or subtraction operations as required for FFT calculations and store the results to registers A1 and A3 respectively. P0 and P1 receive new multiplication results $B_R[2]*W_R[2]$ and $B_I[2]*W_I[2]$ respectively from Mul 1 and Mul 2.

Processing for Cycle #3 proceeds with the contents of registers A0 and A2, preferably the high-ordered portion thereof, being input to registers A0hp and A2hp respectively. The contents of registers Zr0 and Zi0 are input to registers Zr1 and Zi1 respectively, with Zr0 and Zi0 receiving new input values for $A_R$ and $A_I$, herein referred to by index as $A_R[3]$ and $A_I[3]$. Multiplexer 30 retrieves the contents of either register Zr1 or Zi1 that was not retrieved in Cycle #2, the rounding constant is concatenated to the value retrieved, and the concatenated result is provided to ALUs 10 and 12. The contents of registers P0 and P1 are likewise provided to ALUs 10 and 12 which then perform the necessary addition and/or subtraction operations as required for FFT calculations and store the results to registers A0 and A2 respectively. P0 and P1 receive new multiplication results $B_R[2]*W_I[2]$ and $B_I[2]*W_R[2]$ respectively from Mul 1 and Mul 2.

Processing for Cycle #4 proceeds with the completion of an FFT butterfly operation with registers A0hp and A1 being written to memory. Multiplexer 30 retrieves the contents of either register Zr1 or Zi1 that was not retrieved in Cycle #3, the rounding constant is concatenated to the value retrieved, and the concatenated result is provided to ALUs 10 and 12. The contents of registers P0 and P1 are provided to ALUs 10 and 12 which then perform the necessary addition and/or subtraction operations as required for FFT calculations and store the results to registers A1 and A3 respectively. P0 and P1 receive new multiplication results $B_R[3]*W_R[3]$ and $B_I[3]*W_I[3]$ respectively from Mul 1 and Mul 2.

Processing for Cycle #5 proceeds with the completion of the next FFT butterfly operation with registers A2hp and A3 being written to memory. Processing then proceeds in the manner described hereinabove for Cycle #3. Thereafter, processing continues by alternately performing the processing associated with Cycle #4 and Cycle #5 for new inputs and multiplication results until all input data are processed.

Registers A0, A0hp, A2, and A2hp are alternatively referred to herein as first-cycle registers as they receive the FFT calculation result calculated by ALUs 10 and 12 during a first cycle of two consecutive processing cycles (Cycle #1), with registers A1 and A3 being alternatively referred to herein as second-cycle registers as the)receive the FFT calculation result calculated by ALUs 10 and 12 during a second cycle of the two consecutive processing cycles (Cycle #2). Thus it may be seen that each FFT butterfly operation requires only two cycles to complete. The contents of first-cycle register A0hp and second-cycle register A1, shown in dashed lines at Cycles #3, #5, and #7, are then written to memory during a first cycle of two consecutive memory-write cycles (Cycle #4), and the contents of first-cycle register A2h and second-cycle register A3, shown in dashed lines at Cycles #4, #6, and #8, are written to memory during a second cycle of the two consecutive memory-write cycles (Cycle #5).

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A digital signal processor (DSP) comprising:
   at least two multipliers wherein each multiplier is operative to receive either of a real and an imaginary first data value and either of a real and an imaginary coefficient value and multiply said data and coefficient values to provide a multiplication result;
   at least two three-input arithmetic logic units (ALU) wherein each ALU is operative to receive each of said multiplication results from said multipliers and either of a real and an imaginary second data value and perform any of addition and subtraction upon each of said multiplication results and said second data value to provide a Fast Fourier Transform (FFT) calculation result;
   at least two first-cycle registers wherein each first-cycle register is operative to receive said FFT calculation result from one of said ALUs calculated during a first processing cycle of two consecutive processing cycles;
   at least two second-cycle registers wherein each second-cycle register is operative to receive said FFT calculation result from one of said ALUs calculated during a second processing cycle of said two consecutive processing cycles; and
   multiplexing apparatus operative to selectably retrieve and forward for storage in memory said FFT calculation results from one of said first-cycle registers and one of said second-cycle registers during a first memory-write cycle of two consecutive memory write cycles and said FFT calculation results from the other of said first-cycle registers and the other of said second-cycle registers during a second memory-write cycle of said two consecutive memory write cycles.

2. A digital signal processor according to claim 1 and further comprising:
   at least a first cosine data register for receiving real cosine data input;
   at least a second cosine data register for receiving imaginary cosine data input; and
   a multiplexer for selectably providing data from either of said cosine data registers to either of said ALUs.

3. A digital signal processor according to claim 2 and further comprising:
   rounding apparatus operative to concatenate a rounding constant to multiplexed cosine data, thereby forming a low-ordered portion of concatenated input for either of said ALUs.

4. A method comprising the steps of:
   receiving at at least two multipliers either of a real and an imaginary first data value and either of a real and an imaginary coefficient value;
   multiplying at said two multipliers said data and coefficient values to provide a multiplication result;
   receiving at at least two three-input arithmetic logic units (ALU) each of said multiplication results from said multipliers and either of a real and an imaginary second data value;
   performing at said ALUs any of addition and subtraction operations upon each of said multiplication results and said second data value to provide a Fast Fourier Transform (FFT) calculation result;
   receiving at at least two first-cycle registers said FFT calculation result from one of said ALUs calculated during a first processing cycle of two consecutive processing cycles;
   receiving at at least two second-cycle registers said FFT calculation result from one of said ALUs calculated during a second processing cycle of said two consecutive processing cycles; and
   selectably retrieving and forwarding for storage in memory said FFT calculation results from one of said first-cycle registers and one of said second-cycle registers during a first memory-write cycle of two consecutive memory write cycles and said FFT calculation results from the other of said first-cycle registers and the other of said second-cycle registers during a second memory-write cycle of said two consecutive memory write cycles.

5. A method according to claim 4 and further comprising:
   receiving real cosine data input at at least a first cosine data register;
   receiving imaginary cosine data input at at least a second cosine data register; and
   selectably providing data from either of said cosine data registers to either of said ALUs.

6. A method according to claim 5 and further comprising:
   concatenating a rounding constant to multiplexed cosine data, thereby forming a low-ordered portion of concatenated input for either of said ALUs.

* * * * *